United States Patent Office 3,017,373
Patented Jan. 16, 1962

3,017,373
COATING COMPOSITION FOR PAPER
Arne B. Carlson, Keyser, W. Va., assignor to West Virginia Pulp and Paper Company, New York, N.Y., a corporation of Delaware
No Drawing. Filed Jan. 26, 1960, Ser. No. 4,602
10 Claims. (Cl. 260—6)

The present invention relates to mineral coating compositions, especially those adapted to be used as paper coatings suitable to be printed by an offset lithographic process. More particularly it relates to such coating compositions which produce low gloss washproof coatings and hence are especially useful in the manufacture of text book paper and other low gloss coated offset lithographic papers.

In the manufacture of coated offset lithographic paper, it is essential that a coating adhesive be used such that it is of itself or can be made to be washproof. When casein is the adhesive, various methods of obtaining wet rub resistance have been used in the past. One of these methods includes the treatment of casein with formaldehyde to insolubilize the casein and render it resistant to water. Hart in U.S. 2,769,725 shows a method of cast calendering paper, using formaldehyde to insolubilize the casein coating and render the coated surface wet rub resistant. Another method of washproofing casein is by combining casein with an elastomeric material such as butadiene-styrene as is pointed out in Stinchfield et al., U.S. 2,685,571. As Stinchfield also mentions, it is more difficult to washproof a casein coating when calcium carbonate is included in the coating formulation. To overcome this difficulty, Stinchfield advises the use of rather large quantities of latex, at least 25% of the total weight of the adhesive present. Young in U.S. 2,537,114 also points out that improved water resistance can be obtained in casein coatings if part of the adhesive is replaced by a copolymer of butadiene-styrene. Various resins have also been incorporated in coating compositions wherein a protein is used as the main adhesive material. Ritson, Canadian Patent No. 577,661, shows the use of a water-soluble amino resin, such as urea-formaldehyde, with soya protein to obtain wet rub resistance. However, adequate wet rub resistance is difficult to obtain in this manner if relatively large percentages of a basic carbonate pigment material are included in the coating formulation.

While the first two methods of obtaining a washproof composition, as mentioned above, will provide adequate wet rub resistance, both may be objectionable in a specific type coating operation. The use of formaldehyde to insolubilize a protein adhesive such as casein may not be preferred in a high solids coating because of the increase in the viscosity of the coating which results and also because of the difficulty in handling formaldehyde in a mill coating operation. The use of large amounts of latex, while providing wet rub resistance, also provides a coated paper which is very hard to break up in a broke beater, a problem that can be little tolerated in mill operations. The use of latex in large quantities also provides a glossy coating due to its ability to polish upon calender treatment. Paper coated with a glossy coating may be objectionable in certain applications. As an example, in the manufacture of textbook paper a coated paper of low gloss may be more preferable than a coated paper of high gloss because of the glare caused by reflectance of light from the glossy surface.

Coating compositions which produce low gloss can be made using a carbonate pigment material in the coating formulation. With casein as the main adhesive, some practical means of obtaining washproofness has long been sought when a basic carbonate pigment material comprises a relatively large portion of the coating formulation. Resin mixtures such as melamine formaldehyde, urea formaldehyde, and phenol formaldehyde will not ordinarily insolubilize casein in the presence of a basic carbonate pigment, which acts as an inhibitor to the polymerization of casein and resin. Without this polymerization, the coating is not washproof, and paper coated with such a coating will not be suitable for offset lithographic printing operations.

I have found that if a small quantity of resorcinol is included in the coating formulation washproofness can be obtained in a basic coating composition comprising an aqueous slurry of mineral pigment, of which a portion is a basic carbonate pigment material, and an adhesive component comprising a protein as the principal ingredient together with a resin, such as a water soluble modified formaldehyde type resin, as for example melamine formaldehyde, urea formaldehyde, or phenol formaldehyde. If the carbonate material used has a very alkaline nature, such as would be the case when calcium carbonate is used, it hinders the polymerization of a resin material such as melamine formaldehyde resin, which is ordinarily acid catalyzed. I have found that by including a small amount of resorcinol in the formulation, polymerization of the resin mixture and protein does occur to the degree that washproofness of the coating is obtained, the polymerization of the resin mixture and protein being activated by resorcinol, even in the presence of an alkaline carbonate material.

In my preferred formulation, I obtain washproofness of a coating composition comprising calcium carbonate as part of the mineral pigment component, casein as the principal adhesive component, and melamine formaldehyde resin by adding 1% resorcinol based on an adhesive of 10 to 18 parts by weight per 100 parts of pigment component.

Excessive use of resorcinol may result in darkening of the coating composition because resorcinol is a dark colored material. In my preferred formulation I have found that the resorcinol has only a very slight darkening effect if the coating is allowed to age before application to the paper. The maximum amount of resorcinol used in any formulation is only limited by the degree of darkening that can be tolerated. The minimum amount of resorcinol used should be sufficiently in excess of 0 percent to impart to the coated paper the degree of web rub resistance desired.

It is also an objective of this patent to point out various equivalents and extenders that can be used to replace materials in the preferred formulation. For example, I have found that soya protein can be used to replace casein as the principal ingredient in the adhesive portion of the coating composition. Animal glue can also be used to replace casein with slight variations in various other components of the coating formulation, the essential material for washproofness again being resorcinol or resorcinol and an extender. Glue of this nature usually exhibits very little wet rub resistance, but I have found that when it is employed as the primary adhesive ingredient with my novel resin mixture, paper coated with the final coating composition is suitable to be printed by an offset lithographic process.

The invention will be described in greater detail in the following examples.

Example 1

The following ingredients were taken in the proportions stated.

| | Parts by weight |
|---|---|
| Regular coating clay | 47 |
| Ground limestone | 47 |
| Titanium dioxide (rutile) | 6 |
| Casein | 9.7 |
| Azite 900 liquefier (dicyandiamide, 99% pure, produced by American Cyanamid Co.) | 3.4 |
| NH$_4$OH (28%) | .6 |
| Parez 613 (a melamine formaldehyde resin mixture, methylated trimethyol melamine, produced by American Cyanamid Co., F/M=3.) | .8 |
| Resorcinol | .1 |

In preparing the casein adhesive, 290 lbs. of casein and 100 lbs. of azite, dicyandiamide, a non-resinous nitrogeneous material that has the property of reducing the viscosity of certain colloidal solutions, such as starch and protein, are mixed with 1160 lbs. of water at 60 to 70° F. This mixture is then heated to 140° F., after which the casein is cut by adding 18 lbs. of a 28% ammonia solution, giving an ammonium caseinate. Next the resin mixture is prepared by diluting 25 pounds of melamine formaldehyde resin (Parez 613, 80% solids as purchased) to 50% solids with water. Three pounds of resorcinol are then added to the melamine formaldehyde resin mixture. The third step in the preparation of the coating composition involves making a pigment slip to which the products of the first two steps are added. 1500 pounds of dry ground limestone, and 200 pounds of dry TiO$_2$ are charged into a high shear mixing device such as a Reed Sigma Blade Mixer. The ammonium caseinate from step one is added and mixed with the mineral pigments until a slip which exhibits a high shear kneading action in the mixer is formed. This kneading action is continued for approximately ½ hour or until all pigment is well dispersed, and the remainder of the ammonium caseinate is added. The total solids content is then adjusted to 62% with water. The resin mixture of resorcinol and melamine formaldehyde is then added to the pigment slip, after which the coating is screened and is ready for use. The pH of the final coating is approximately 9.0. The above procedure is also a suitable way to prepare a coating using soya protein in place of casein.

It should be noted that the preparation of the resin mixture, step two, should not be performed such that the mixture stands for lengthy periods of time before being added to the coating color. The resin mixture tends to darken upon standing.

The coating composition of the above example was applied to one side of a 60 lb. raw paper stock at a coat weight of about 6½ lbs. per 500-ream of 25 x 38 inch sheets. The coated paper was dried under normal paper making drying conditions and tested for its physical and optical properties. The coated sheet had a gloss according to Tappi Standard T-480m-51 of about 10 and a G.E. brightness of about 80 according to Tappi Standard T-452m-48. The coating was found to be washproof after 3 days by the following test. A small sample of the coated paper is placed upon black art posterboard such that the posterboard extends beyond one edge of the coated sheet. One drop of distilled water is placed on the coated sheet and allowed to stand for 15 seconds. The surface of the coated sheet is then rubbed lightly with the finger to transfer the water laterally from the coated sheet to an uncovered portion of the posterboard. The water is allowed to dry on the posterboard and if a white residue remains, the coating is considered to be unsuitable for offset lithographic printing operations since it is not washproof. If, however, the black posterboard contains no white residue after drying, the coated paper is considered to be sufficiently washproof to be used as an offset lithographic paper.

All coatings in the following examples were applied to one side of a 60 pound raw paper stock at coat weights from 6 to 8 pounds per 500-ream of 25 x 38 inch sheets.

Example 2

| | Parts by weight |
|---|---|
| Regular coating clay | 47 |
| Ground limestone | 47 |
| TiO$_2$ (rutile) | 6 |
| Latex (a copolymer of butadiene-styrene such as Dow Latex 512R, 46% solids) | 3.4 |
| Casein | 9.7 |
| Azite 900 liquefier | 3.4 |
| NH$_4$OH (28%) | .6 |
| Parez 613 | .8 |
| Resorcinol | .1 |

This coating was prepared in a manner similar to Example 1, with the latex being added to the dispersed pigment slurry before the total solids content is adjusted to 62% with water. The resin mixture of resorcinol and melamine formaldehyde was then added to the pigment slip. This coating was then applied to one side of a 60 pound raw paper stock in the manner previously stated. The coated sheet had the following properties: good washproofness after 3 days, a gloss of about 10.8, and a G.E. brightness of 79.5.

The latex included in Example 2 may be omitted from the coating formulation and washproofness of the coating maintained. The latex is included only to gain the necessary printability qualities of an offset lithographic paper, and the amount used is a compromise between gloss and the printing qualities of the finished sheet. The latex in the small quality used does contribute slightly to wet rub resistance, but is not needed for this purpose when making the coating composition of my invention.

Example 3

| | Parts by weight |
|---|---|
| Regular coating clay | 79 |
| Ground limestone | 15 |
| TiO$_2$ | 6 |
| Dow Latex 512R | 3.4 |
| Casein | 9.7 |
| Azite 900 liquefier | 3.4 |
| NH$_4$OH (28%) | .6 |
| Parez 613 | .8 |
| Resorcinol | .1 |

This coating was prepared in the same manner as Example 2 and the coated sheet had the following properties: good washproofness, gloss of 30, and G.E. brightness of 78.5. The increase in gloss was due to the decrease in the amount of ground limestone used and the corresponding increase in the amount of regular coating clay used.

Example 4

Example 3 was repeated using 80 parts by weight of ground limestone and 14 parts by weight of regular clay. This coating was washproof, even in the presence of the large amount of calcium carbonate, with a gloss of approximately 10, and G.E. brightness of 80.0.

Example 5

Example 3 was repeated using precipitated calcium carbonate (Purecal O, purchased from Wyandotte Chemical Corp.) to replace ground limestone. This coating was found to be washproof after 3 days and the coated sheet has a gloss of 30, and G.E. brightness of 78.0.

Example 6

Example 4 was repeated using 80 parts by weight of precipitated calcium carbonate, to replace ground limestone, together with 14 parts by weight of regular clay. The coated sheet exhibited the following properties: gloss 10, G.E. brightness 80.0 and the coated sheet had good wet rub resistance after 3 days.

Example 7

Example 2 is repeated using magnesium carbonate to replace ground limestone. The coated sheet had wet rub resistance after 3 days, a gloss of 10, and a G.E. brightness of 79.5.

Example 8

Example 2 is repeated using barium carbonate to replace ground limestone. The coated sheet was washproof after 3 days, had a gloss of 10 and a G.E. brightness of 79.0.

Example 9

Example 1 was repeated using urea formaldehyde resin (Beckamine P685–50, a urea formaldehyde resin, 50% solids, produced by Reichhold Chemicals, Inc., $F/U=1.2$) to replace the melamine formaldehyde resin mixture. The coated sheet was washproof after 3 days, had a gloss of 10 and a G.E. brightness of 79.0.

Example 10

Example 1 was repeated using phenol formaldehyde resin (Durez BLL–1191), a phenol formaldehyde resin, 50% solids, produced by Union Carbide Corp., $F/P=1.34$) to replace the melamine formaldehyde resin mixture. The coated sheet was washproof after 3 days, had a gloss of 10, and a G.E. brightness of 79.5.

Example 11

Example 2 was repeated using urea formaldehyde resin (Beckamine P–685–50) to replace the melamine formaldehyde resin. The coated sheet was washproof after 3 days, had a gloss of 10, and a G.E. brightness of 80.2.

Example 12

Example 2 was repeated using phenol formaldehyde resin (Durez BLL–1191) to replace the melamine formaldehyde resin. The coated sheet was washproof after 3 days, had a gloss of 10, and a G.E. brightness of 80.5.

Example 13

| | Parts by weight |
|---|---|
| Regular coating clay | 47 |
| Ground limestone | 47 |
| TiO₂ (rutile) | 6 |
| Dow Latex 512R | 3.4 |
| Casein | 9.7 |
| Azite 900 liquefier | 3.4 |
| NH₄OH (28%) | 6 |
| Parez 613 | 8 |

This formulation is similar to Example 2, except that resorcinol has been excluded. The finished coated sheet had a gloss of about 11, a G.E. brightness of 80.5, but was not washproof, even after 3 days, indicating the need for resorcinol in this coating formulation in order to gain wet rub resistance.

Example 14

| | Parts by weight |
|---|---|
| Regulator coating clay | 47 |
| Ground limestone | 47 |
| TiO2 (rutile) | 6 |
| Soya protein | 9.7 |
| Azite 900 liquefier | 3.4 |
| NH₄OH (28%) | .6 |
| Parez 613 | .8 |
| Resorcinol | .1 |

This coating was prepared in the same manner as Example 2 and the coated sheet exhibited excellent wet rub resistance and had gloss of 10.

Example 15

| | Parts by weight |
|---|---|
| Regular coating clay | 47 |
| Ground limestone | 47 |
| TiO₂ (rutile) | 6 |
| Animal glue (Darling Green Label Glue produced by Darling and Co.) | 9.7 |
| Azite 900 liquefier | 3.4 |
| Parez 613 | 1.2 |
| Resorcinol | .15 |

The above coating was prepared in the same manner as Example 1. The glue solution for this coating was prepared by heating the glue, azite, and water to 140° F. The finished coated sheet was washproof after 3 days and had a gloss of 10.

Example 16

Example 15 was repeated using urea formaldehyde resin (Beckamine P685–50) to replace the melamine formaldehyde resin. The coated sheet exhibited good wet resistance.

Example 17

Example 15 was repeated using phenol formaldehyde resin (Durez BLL–1191) to replace the melamine formaldehyde resin. The coated sheet was washproof after 3 days.

Example 18

| | Parts by weight |
|---|---|
| Regular coating clay | 47 |
| Ground limestone | 47 |
| TiO₂ (rutile) | 6 |
| Latex 512R | 3.4 |
| Animal glue (Darling Green Label) | 9.7 |
| Azite 900 liquefier | 3.4 |
| Parex 613 | 1.2 |
| Resorcinol | .15 |

A sheet coated with the above coating was washproof exhibited good printability.

Example 19

Example 15 was repeated using magnesium carbonate to replace ground limestone. The finished coated sheet was wet rub resistant and had a gloss of 10.

Example 20

Example 15 was repeated using barium carbonate to replace ground limestone. The finished coated sheet was washproof after 3 days and had a gloss of 10.

I have found that various extenders may be used to partially replace desorcinol in the above mentioned examples and maintain the high degree of wet rub resistance illustrated. These extenders are phenolic-like compounds such as phenol, hydroquinone, meta cresol, pyrocatechol, and 3,5 xylenol. The amount of extender used to replace resorcinol should not exceed 50%. The use of larger replacements for resorcinol will result in a decrease of the wet rub resistant properties of the finished coated sheet.

Example 21

| | Parts by weight |
|---|---|
| Regular coating clay | 47 |
| Ground limestone | 47 |
| TiO₂ (rutile) | 6 |
| Dow Latex 512R | 3.4 |
| Casein | 9.7 |
| Azite 900 liquefier | 3.4 |
| NH₄OH (28%) | .6 |
| Parez 613 | .8 |
| Resorcinol | .05 |
| Meta cresol | .05 |

A sheet coated with the above formulation had a gloss of about 10, a G.E. brightness of 80, and was washproof after 3 days.

The final gloss of the finished sheet in all of the above examples will depend upon the type and amount of finishing process performed. I have found that gloss values of my preferred formulation will vary generally between 10 and 25 after supercalendering, depending upon the type and amount of calendering done.

In all the above examples, I have varied the adhesive component of the coatings between 10 and 15 parts per 100 parts of pigment component. I have made coatings which utilized as high as 18 parts of adhesive component per 100 parts of pigment component, and there is no reason why even higher proportion of adhesive can not be used in specific applications where a high adhesive content might be beneficial.

Various changes may be made in the examples specifically set forth without departing from the spirit of the invention or the scope of the appended claims.

I claim:

1. An aqueous coating composition for paper which comprises a pigment component, 15–80% of which is a basic carbonate pigment material based on the weight of the total pigment content, a protein adhesive in the amount of at least about 9 parts by weight per 100 parts of total pigment content, a water soluble modified formaldehyde resin in the amount of about 8% based on the weight of the protein adhesive, and at least 12% resorcinol based on the weight of said water soluble modified formaldehyde resin.

2. An aqueous coating composition for paper which comprises a pigment component, 15–80% of which is a basic carbonate pigment material based on the total pigment content, a protein adhesive in the amount of about 9–16 parts by weight per 100 parts of total pigment content, a water soluble modified formaldehyde resin in the amount of about 8% based on the weight of the protein adhesive, and at least 12% resorcinol based on the weight of said water soluble modified formaldehyde resin.

3. An aqueous coating composition for paper which comprises a pigment component, 47% of which is a basic carbonate pigment material based on the total pigment content, a protein adhesive in the amount of about 9–16 parts by weight per 100 parts of total pigment content, a water soluble modified formaldehyde resin in the amount of about 8% based on the weight of the protein adhesive, and at least 12% resorcinol based on the weight of said water soluble modified formaldehyde resin.

4. An aqueous coating composition for paper which comprises a pigment component, 47% of which is calcium carbonate based on the total pigment content, casein in the amount of at least about 9 parts by weight per 100 parts of total pigment content, melamine formaldehyde resin in the amount of about 8% based on the weight of casein, and at least 12% resorcinol based on the weight of the melamine formaldehyde resin.

5. An aqueous coating composition for paper which comprises a pigment component, 15–80% of which is a basic carbonate pigment material based on the total pigment content, a protein adhesive in the amount of at least about 9 parts by weight per 100 parts of total pigment content, a water soluble modified formaldehyde resin in the amount of about 8% based on the weight of the protein adhesive, and at least 12%, based on the weight of the water soluble modified formaldehyde resin, of a mixture of resorcinol and a material selected from the group consisting of phenol, hydroquinone, metacresol, pyrocatechol, and 3, 5 xylenol, wherein said mixture contains a minimum of 50% resorcinol.

6. An aqueous coating composition for paper which comprises a pigment component, 47% of which is calcium carbonate based on the total pigment content, casein in the amount of at least about 9 parts by weight per 100 parts of total pigment content, melamine formaldehyde resin in the amount of about 8% based on the weight of casein, and at least 12%, based on the weight of the melamine formaldehyde resin, of a mixture of resorcinol and a material selected from the group consisting of phenol, hydroquinone, metacresol, pyrocatechol, and 3, 5 xylenol, wherein said mixture contains a minimum of 50% resorcinol.

7. A low gloss coated paper suitable for printing by an offset lithographic process which comprises a base sheet of paper and a coating thereover comprising 15–80% of a basic carbonate pigment material based on the total pigment content, a protein adhesive in the amount of at least about 9 parts by weight per 100 parts of total pigment content, a water soluble modified formaldehyde resin in the amount of about 8% based on the weight of the protein adhesive, and at least 12% resorcinol based on the weight of said water soluble modified formaldehyde resin.

8. A low gloss coated paper suitable for printing by an offset lithographic process which comprises a base sheet of paper and a coating thereover comprising 47% calcium carbonate based on the total pigment content, casein in the amount of at least about 9 parts by weight per 100 parts of total pigment content, melamine formaldehyde resin in the amount of about 8% based on the weight of casein, and at least 12% resorcinol based on the weight of the melamine formaldehyde resin.

9. A coated paper suitable for printing by an offset lithographic process and exhibiting a gloss in the range of about 10–30 which comprises a base sheet of paper and a coating thereover comprising 15–80% calcium carbonate based on the total pigment content, casein in the amount of at least about 9 parts by weight per 100 parts of total pigment content, melamine formaldehyde resin in the amount of about 8% based on the weight of casein, and at least 12% resorcinol based on the weight of the melamine formaldehyde resin.

10. A coated paper suitable for printing by an offset lithographic process and exhibiting a gloss in the range of about 10 which comprises a base sheet of paper and a coating thereover comprising 47% calcium carbonate based on the total pigment content, casein in the amount of at least about 9 parts by weight per 100 parts of total pigment content, melamine formaldehyde resin in the amount of about 8% based on the weight of the casein, and at least 12% resorcinol based on the weight of the melamine formaldehyde resin.

References Cited in the file of this patent

UNITED STATES PATENTS 2,550,143  Eger _____ Apr. 24, 1951

UNITED STATES PATENT OFFICE
CERTIFICATE OF CORRECTION

Patent No. 3,017,373                         January 16, 1962

Arne B. Carlson

It is hereby certified that error appears in the above numbered patent requiring correction and that the said Letters Patent should read as corrected below.

Column 5, line 52, Example 13, for "$NH_4OH$ (28%)----6" read -- $NH_4OH$ (28%)-----.6 --; line 53, same Example 13, for "Parez 613----8" read -- Parez 613 ----.8 --; line 64, Example 14, for "Regulator" read -- Regular --; column 6, line 51, for "desorcinol" read -- resorcinol --; column 7, line 11, for "proportion" read -- proportions --.

Signed and sealed this 5th day of June 1962.

(SEAL)
Attest:

ERNEST W. SWIDER
Attesting Officer

DAVID L. LADD
Commissioner of Patents